Jan. 16, 1951  R. A. WEINHARDT  2,538,179
ROTARY POWER GENERATOR
Filed Sept. 4, 1945  2 Sheets-Sheet 1
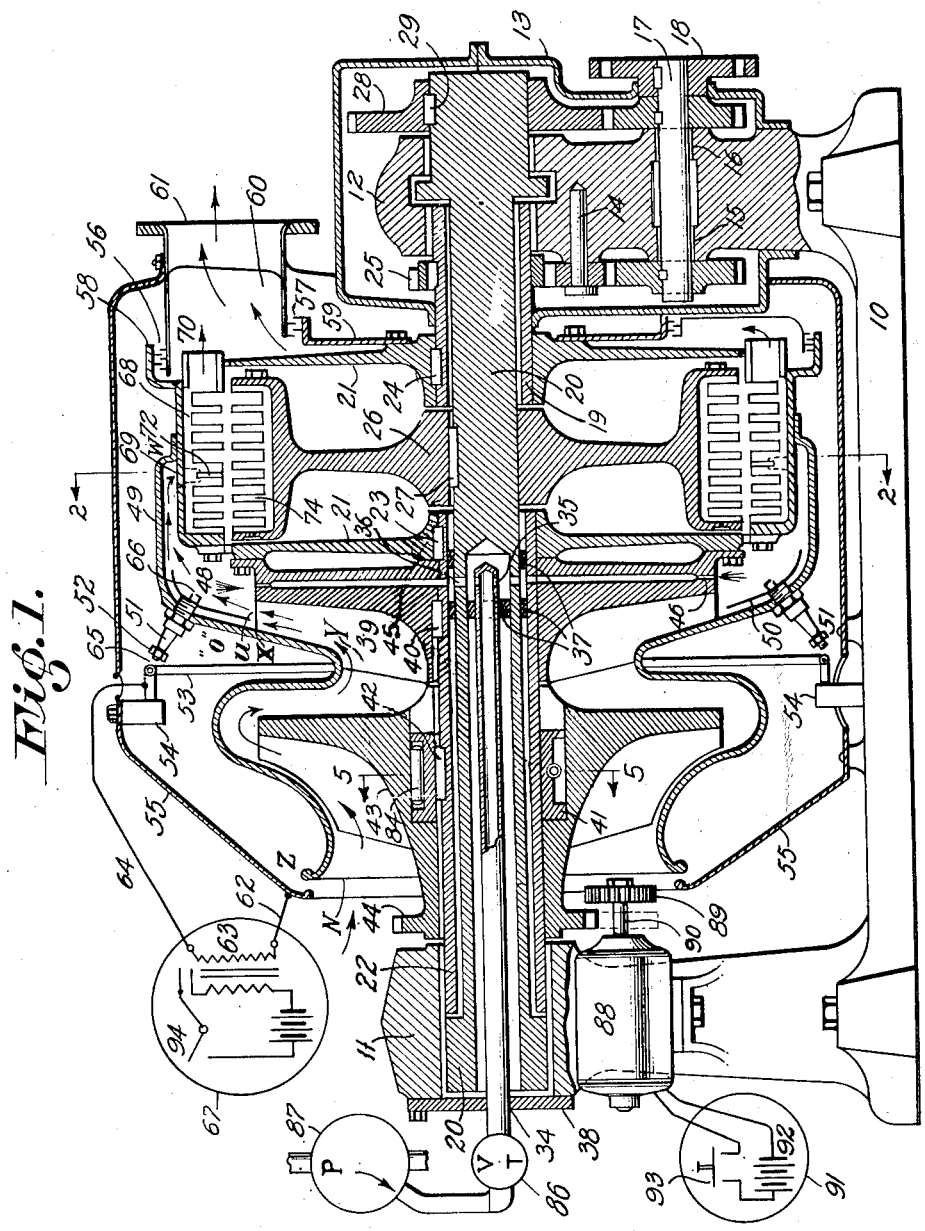
Inventor
Robert A. Weinhardt

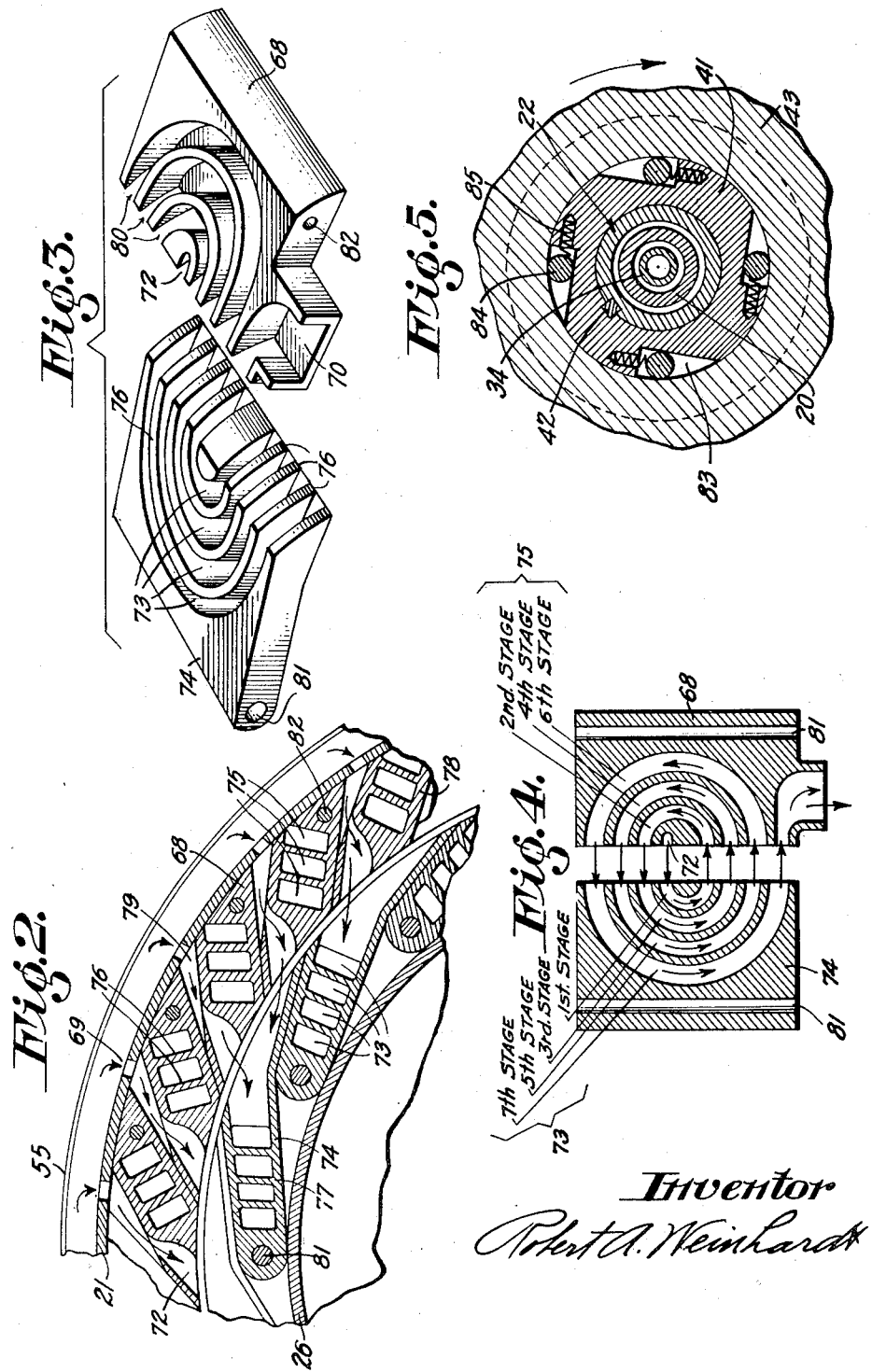

Patented Jan. 16, 1951

2,538,179

UNITED STATES PATENT OFFICE 2,538,179

ROTARY POWER GENERATOR

Robert A. Weinhardt, Detroit, Mich.; Grace K. Weinhardt administratrix of said Robert A. Weinhardt, deceased Application September 4, 1945, Serial No. 614,221

4 Claims. (Cl. 60—41)

This invention relates to power generators, and particularly to rotary power generators using a fluid as the medium for converting thermal energy into mechanical energy. I am aware that heretofore fluid power generators have been built consisting of an air compressor, driven by a fluid turbine, said turbine being driven by a fluid drawn from a combustion chamber, into which chamber the air from said compressor is pumped and compressed and with the admission of fuel into said combustion chamber, combustion is engendered, thus elevating the temperature of the fluid, after which the fluid is admitted into the turbine buckets where it is expanded and the thermal energy is converted by the turbine rotors through impulse and reaction forces set up by the expanding fluid while passing through the rotor's buckets into mechanical energy. Such power generators are generally known as "gas turbines."

To start such power generators functioning, some external independent power source is utilized, to rotate the turbine and compressor shaft as a single unit in order to rotate the compressor to impress air under slight pressure (above atmosphere) to support combustion in the combustion chamber; this means of starting is cumbersome and wasteful of power as well as slow in starting the generator.

The over-all efficiency of present power generators is low, due to thermal losses in and through their structure, as well as design, which permits of fluid frictional losses and losses by radiation and leakage.

It is, therefore, an object of the present invention to provide a rotary power generator of such form and embodying such elements as will remove or reduce the thermal losses and also the fluid frictional losses, and fluid leakage.

It is another object to provide a rotary power generator that is readily started by external power means, using only a very small source of power.

Another object is to provide a rotary power generator that is compact and rigid in construction.

Another object is to provide a rotary power generator that is reliable in operation yet low in cost of production.

Another object is to provide a rotary power generator that is high in thermal efficiency and also mechanical efficiency, hence high in overall efficiency.

Another object is to provide a rotary power generator in which the fluid at high temperatures can be utilized.

Another object is to provide a rotary power generator having rotor buckets made of material that will resist the erosive effects of the high temperature fluid.

Another object is to provide a rotor having buckets that utilize and convert into rotary mechanical energy a greater portion of the fluid's thermal energy.

Another object is to provide rotors so disposed that their buckets receive the fluid impact or influx at a highly efficient angle.

Another object is to provide a rotary power generator that produces a greater horsepower output per pound of fuel consumed per horsepower hour.

Another object is to provide a fuel feed system and injection means that injects liquid fuel into the combustion chamber in a manner and form to induce efficient and rapid combustion.

Another object is to provide a power generator wherein the main shaft bearing life is prolonged and their values enhanced.

These objects are attained by the structure indicated in the appended drawings and specification.

Other objects and advantages of this invention will become apparent from a reading of the following description taken in connection with the accompanying drawings in which Fig. 1 is a longitudinal sectional view of a rotary power generator embodying the present invention.

Fig. 2 is sectional view taken on line 2—2 in Figure 1 through the buckets of the rotors, indicating the relative position of same respective to their common axis and respective to each other.

Fig. 3 is a perspective view of one internal and one external bucket element detached from their respective rotors and having their top or ceiling walls removed.

Fig. 4 is a sectional view of one internal and one external bucket element detached from their respective rotors, diagrammatically showing the path of the fluid as it issues from the nozzle and flows through the buckets of the rotors until finally discharged as exhaust.

Fig. 5 is a sectional view on line 5—5 in Figure 1 showing the general construction of the compressor driving clutch.

Like numerals refer to like parts throughout the various figures.

Referring now to the drawings, numeral 10 is the base or foundation carrying the bearings 11 and 12, also gear box 13 and pinion stud 14, on which is rotatably mounted a pinion. The base 10 also carries bearings 15 and 16 rotatably supporting a power take-off shaft 17 with its flange 18.

In bearing 11 is rotatably mounted outer turbine rotor hollow shaft 22 and also rotatably mounted the hollow portion of inner turbine rotor shaft 20. Numeral 21 indicates the outer turbine rotor assembly, said assembly being keyed to shafts 22 and 19 by keys 23 and 24. Turbine rotor shaft 19 has keyed to its external end, gear 25.

Inner turbine rotor 26 has key 27 affixing it to shaft 20 and to the one end of shaft 20 is keyed the gear 28 by key 29. Inner turbine rotor shaft 20 is supported rotatably in bearings 11 and 12.

Outer turbine rotor hollow shaft 19 is supported rotatably by bearing 12.

Into the hollow portion of shaft 20 extends the fuel pipe 34 with its fuel outlet openings 35 in approximate register with similar openings 36 in shaft 20 and shaft 22. Seals are provided as indicated by 37, and pipe 34 is supported by bushing 38. The extension of combustion chamber wall 49 forms the casing for the compressor impellers 39 and 43.

Compressor impeller 39 is keyed for driving by key 40 to shaft 22, also the driving hub 41 of over-running clutch has key 42 affixing it to shaft 22. Letter N is the compressor inlet port and letter U is the compressor outlet port.

Supported on the clutch hub 41 and also on shaft 22 is another compressor impeller 43 whose own hub extends toward bearing 11 and has affixed to it the impeller starter gear 44; fuel injection ducts 45 and 46 may be either in the form of drilled holes or flat disc-like slots. These extend from a point of register with ports 35 and 36 radially outward and into combustion chamber 48 into which the fuel is sprayed.

Combustion chamber outer wall 49 is affixed fluid tight at point "W" to turbine rotor 21 and is also affixed to impeller 39 from point X to point Y so that turbine rotor 21 and second stage compressor impeller 39 are operatively interconnected and rotate as a unit. Said wall 49 extends freely from point Y to point Z. Combustion chamber inlet port is indicated as at O and outlet ports at 69.

A deflector wall 50 is attached to wall 49, also spark plug 51 is placed to pass in close proximity with its terminal 52, close to the stationary ring 53 supported by insulators 54 on the stationary housing 55 and on base 10.

Rotatable seals against fluid leaks are provided at 56 and 57 between an extension 58 on rotor 21 and the rotating wall 59 and the stationary exhaust fluid collector ring 60. Stationary housing 55 is supported by the base 10 and in turn supports the exhaust collector ring 60 with its fluid exhaust outlet port 61. A ground wire 62 connects stationary housing 55 to secondary of spark coil 63 and lead wire 64 connects to stationary terminal 53. Contact is made between spark plug terminal 52 by arcing across the air gap as at 65 and another gap as at 66.

In circle 67 is indicated in series a battery, a switch 94 and a vibrator transformer coil capable of producing a secondary current of high voltage at the spark plug gap 66. To internal surface of the peripheral rim of turbine rotor 21 are affixed turbine bucket elements 68 having fluid inlet ports in register with ports in rotor peripheral rim 69, and with exhaust outlet 70 projecting outwardly into exhaust collector ring 60. Affixed to the external surface of peripheral rim of turbine rotor 26 are turbine bucket elements 74. Turbine bucket elements 68 and 74 are disposed laterally relatively to one another so that efflux of any one stage will be the influx of the next succeeding stage as indicated in Fig. 4. From nozzle 72 located in bucket element 68 the fluid issues under high temperature and pressure and enters the first stage bucket 73 located in element 74 and therefrom entering directly into the second stage bucket 75 located in element 68 and so on successively through as many and various stages as the design may designate, the fluid passing alternately at each stage to and from the outer turbine rotor buckets to the inner turbine rotor buckets until the final stage is reached at which point the fluid passes out at the exhaust port 70 as exhaust fluid into the collector ring 60 and exhaust outlet port 61 at reduced pressure and reduced temperature.

Turbine bucket elements 68 and 74 are of heat resistant material, such as alloy steel, or non-metallic material as ceramic, or a molded compounded material.

The buckets 73 and 75 are approximately semi-circular in form and rectangular in cross section, being formed by walls 76 extending perpendicularly from a floor 77 and 78 upward to come into contact with the ceiling of the element, to form said rectangular channels 80. Means to affix the elements to their respective turbine rotor rims are indicated at 81 and 82 as a through pin or bolt. Fluid is conducted from ports 69 to nozzles 72 by means of the passage 79 which is sealed against leakage at time of assembly.

The over-running clutch shown in section in Fig. 5 consists of hub 41 having several wedge shaped notches 83 recessed in its periphery and extending across the face of said hub. In each notch 83 a roller 84 is fitted, a spring 85 at each roller forcing roller 84 toward the pointed end of wedge shaped notch 83 until roller contacts both the hub of impeller 43 and the clutch hub 41. Thus when shaft 22 is standing idle impeller 43 is freely rotatable in the direction of the arrow (see Fig. 5).

Whenever shaft 22 is revolved at a speed greater than hub 43 the rollers 84 will lock in the wedged shaped notches and cause impeller 43 to rotate with it as a unit.

Fuel is supplied to the injector system through fuel pipe 34 through a throttling or metering valve 86.

A pump 87 maintains the fuel supply under pressure at the said valve 86, drawing its charge from a supply tank not shown, to which also is returned any surplus fuel pumped above the fuel required by the power generator. Pump 87 is mounted on base 10 and driven by gear 44.

Various types of starting device may be used, but for simplicity an electric motor starter 88 having a shiftable pinion 89 on its power shaft 90 is here shown.

Starter motor 88 is supported on base 10 in a position that provides proper meshing of the starter pinion 89 with gear 44.

In circle 91 is diagrammed the source of electrical current a battery 92 in series with a switch 93 and the winding of said electric motor 88.

The gears shown in gear box 13 are subject to a variety of constructional designs and various ratios and are a matter of common knowledge so no claim or description of same is here made, it is to be noted that by choice of ratios the respective speeds of the turbine rotors can be set so that one turbine rotor will run at, say for example 5,000 rev. while the other runs at 10,000, thus making a combined relative speed of 15,000 revolutions per minute.

Operation of this power generator is simplicity itself, as the following explanation indicates.

Switch 94 is closed, the battery through the transformer causes current to establish a series of electric arcs at point 65 and at point 66, starter switch is now closed, causing electric starter motor 88 to rotate whereupon the pinion 89 automatically shifts into mesh with gear 44 thus impeller 43 is rotated in the direction of arrow shown in Fig. 5, also fuel pump 87 builds up pressure in the fuel throttle valve 86 and as the operator now opens this throttle valve slightly, fuel in the form of a fine spray or gas is delivered to the combustion chamber 47 through the fuel pipe 34 and injector ports 35 and 36 and ducts 45 and 46.

The impeller 43 being rotated draws fluid or air through inlet N and out through outlet U into combustion chamber 47 thru its inlet at O pumping the fluid at some pressure into the combustion chamber 47 where the deflector 50 causes part of the fluid pumped to pass along the combustion chamber outer wall 49 to keep its temperature down, the balance of the fluid pumped passes directly across the path of the fuel being ejected from the fuel ducts 45 and 46 where the fluid and fuel combine to form a combustible mixture. This mixture is ignited by the heat of the arc as at 66; after ignition is started switch 94 is opened to stop the arcing at 66, and combustion is self sustaining.

The combustion raises the temperature of the fluid, which now passes from the ports 69 and out of nozzles 72 and expands while passing through the several stages of turbine buckets on the turbine rotor rims passing alternately from one turbine rotor to the other and finally out through the exhaust port at or near the pressure of the atmosphere and at a temperature very much lower than it had when it entered the nozzles 72.

The energy given up by the drop in temperature and pressure is partly converted into mechanical energy by the forces exerted by the expanding fluid against the curved surfaces of the turbine buckets in the form of impulse and reaction forces, that cause the turbine rotors to rotate about their common axis, the one rotor in one direction, the other turbine rotor in the opposite direction.

As the fluid now causes turbine rotor 21 to rotate it also causes impeller 43 to rotate, thus more fluid is pumped into the combustion chamber 47 whereby more energy is made available, hence turbine rotors increase their power output and rotative speed.

When the turbine rotor 21 has attained a rotative speed equal to the speed of impeller 43, the clutch hub 41 will advance in relation to the impeller 43 and cause rollers 84 to wedge and lock these two hubs together, thereafter the rotor drives the impeller 43 and the starter switch is opened to allow the starter motor to drop down in speed; which action causes the starter shaft gear to shift itself out of mesh with gear 44.

The power generator is now operating on its own generated power, any surplus energy created over the energy required to drive the compressor is available as power to do any kind of mechanical work, through the medium of the gears in the gear box 13 and the power take-off shaft and flange 18.

The power output can now be varied as desired by manipulation of the fuel throttle valve either by the operator or by means of a mechanical governor attached to said throttle valve.

It will be apparent to those skilled in the art that various modifications in construction and design may be made without departing from the spirit or scope of the invention as defined by the appended claims. I do not therefore wish to be limited to the structure herein shown and described.

What I claim and desire to secure by Letters Patent is:

1. A rotary power generator comprising a fluid compressor having an inlet and an outlet port, a combustion chamber having an inlet and outlet ports, said compressor outlet port being attached to said combustion chamber inlet port to receive said fluid from said compressor means for injecting fuel into said combustion chamber, means for initiating combustion in said combustion chamber, a pair of turbine rotors having buckets mounted co-axially one within the other in radially spaced relationship, said turbine rotors having nozzles and turbine buckets disposed at the rotor peripheries in circular sequence, said combustion chamber outlet ports terminating in said nozzles, one of said turbine rotors having its circle of buckets encompassed by the circular sequence of buckets of the other said rotors.

2. A rotary power generator comprising a fluid compressor having an inlet and an outlet port, a combustion chamber having an inlet port and outlet ports, said compressor outlet port being connected to said combustion chamber inlet port, means for injecting fuel into said combustion chamber means for initiating combustion in said combustion chamber, a pair of turbine rotors having buckets mounted co-axially one within the other in radially spaced relationship, said combustion chamber outlet ports terminating in nozzles, said turbine rotors having opposed buckets with arcuate interconnecting recesses therein, said nozzles aligned to deliver said fluid into said turbine rotor buckets, one or more impellers of said compressor being arranged to be driven by said turbine rotors.

3. A rotary power generator comprising a fluid compressor, having an inlet port and an outlet port, a combustion chamber having an inlet port and outlet ports, said compressor outlet being connected to said combustion chamber inlet port, means to inject fuel into said combustion chamber, means to ignite said fuel in said combustion chamber, a pair of turbine rotors having buckets mounted co-axially one within the other in radially spaced relationship, said combustion chamber outlet ports terminating in turbine fluid nozzles, said turbine rotors having opposed buckets inclined relatively to the radii thereof and having arcuate interconnecting recesses therein said nozzles aligned to deliver said fluid into the proper turbine buckets, said compressor having a rotary impeller, said compressor impeller and said turbine rotors all co-axially disposed and coupled together said impeller being driven by said turbine rotors.

4. A rotary power generator comprising a fluid compressor having an inlet port and an outlet port, a combustion chamber having an inlet port and outlet ports, said compressor outlet port being connected to said combustion chamber inlet port, means for injecting fuel into said combustion chamber, means to inject fuel into said combustion chamber, means to ignite said fuel in said combustion chamber, a pair of co-axially disposed turbine rotors having buckets arranged one within the other, one of said turbine rotors having its buckets located on the external surface of its peripheral rim, the other rotor having its buckets located on the internal surface of its peripheral rim, said combustion chamber outlet ports terminating in turbine nozzles, said nozzles being disposed in alignment with said turbine rotor buckets, said compressor being arranged to be coupled to and driven by said turbine rotors.

ROBERT A. WEINHARDT.

REFERENCES CITED

The following references are of record in the file of this patent:

UNITED STATES PATENTS

| Number | Name | Date |
| --- | --- | --- |
| 911,825 | Lentz | Feb. 9, 1909 |
| 960,160 | De Ferranti | May 31, 1910 |
| 1,759,817 | Röder | May 20, 1930 |
| 1,845,955 | Bonom | Feb. 16, 1932 |
| 2,360,130 | Heppner | Oct. 10, 1944 |
| 2,396,804 | Ormsby | Mar. 19, 1946 |
| 2,400,714 | Rowledge | May 21, 1946 |

FOREIGN PATENTS

| Number | Country | Date |
| --- | --- | --- |
| 467,630 | Great Britain | June 21, 1937 |